United States Patent [19]

Shooter et al.

[11] 4,014,139
[45] Mar. 29, 1977

[54] WHEEL BALANCE AND TRUING MACHINE

[76] Inventors: Donald H. Shooter; Otto F. Colbert, both of 7913 Chatfield Ave., Whittier, Calif. 90605

[22] Filed: Sept. 11, 1975

[21] Appl. No.: 612,357

Related U.S. Application Data

[62] Division of Ser. No. 432,461, Jan. 11, 1974, Pat. No. 3,911,751.

[52] U.S. Cl. .................................. 51/5 R; 51/51; 51/106 R; 51/DIG. 33
[51] Int. Cl.² .......................................... B24B 5/00
[58] Field of Search ............... 51/DIG. 33, 51, 106, 51/233, 3, 5 R; 73/459, 468, 474, 462

[56] References Cited
UNITED STATES PATENTS

| 1,639,444 | 8/1927 | Terry | 73/468 |
|---|---|---|---|
| 2,322,939 | 6/1943 | Inman | 73/459 X |
| 2,349,602 | 5/1944 | Baldenhofer | 51/233 X |
| 2,378,018 | 1/1945 | Inman | 73/459 X |
| 2,610,446 | 9/1952 | Hawkinson | 51/51 |
| 3,036,467 | 5/1962 | McWhorter | 73/459 |
| 3,782,203 | 1/1974 | Dalrymple | 73/468 |
| 3,785,210 | 1/1974 | Muller | 73/474 X |

FOREIGN PATENTS OR APPLICATIONS

| 242,694 | 1/1963 | Australia | 73/459 |
|---|---|---|---|
| 559,712 | 10/1957 | Belgium | 73/462 |

*Primary Examiner*—Harold D. Whitehead
*Attorney, Agent, or Firm*—Keith D. Beecher

[57] ABSTRACT

A wheel-balance machine is provided in which a wheel and tire combination is mounted on a rotatable hub. The hub may be adjusted to be freely rotatable so as to determine and compensate for static unbalances of the tire/wheel combination, and it may be controlled to be rotated at high speed, so as to determine any dynamic unbalances in the tire/wheel combination. A power-driven abrasive wheel is also mounted in the machine, and it is driven rotatably and in a reciprocal longitudinal manner to grind the peripheral surface of the tire, in order to true the periphery of the tire with respect to its axis of rotation. Electric lamp indicators are provided which are selectively de-energized during the dynamic balance test of the tire/wheel combination, and which serve to indicate the angular positions on the tire at which compensating balances should be mounted to offset the dynamic unbalance. Also, a pneumatic bearing is provided which may be inflated to a relatively high pressure to hold the rear end of the drive shaft of the machine on its axis of rotation during the aforesaid grinding step, and which may be deflated to a reduced pressure to permit the rear end of the drive shaft to be displaced radially during the dynamic balance test in the event the dynamic unbalance condition exists in the tire/wheel combination. All of the foregoing operations are carried out in a single machine in an expeditious manner, and without the need to remove the tire/wheel combination from the machine until all the operations have been completed.

6 Claims, 7 Drawing Figures

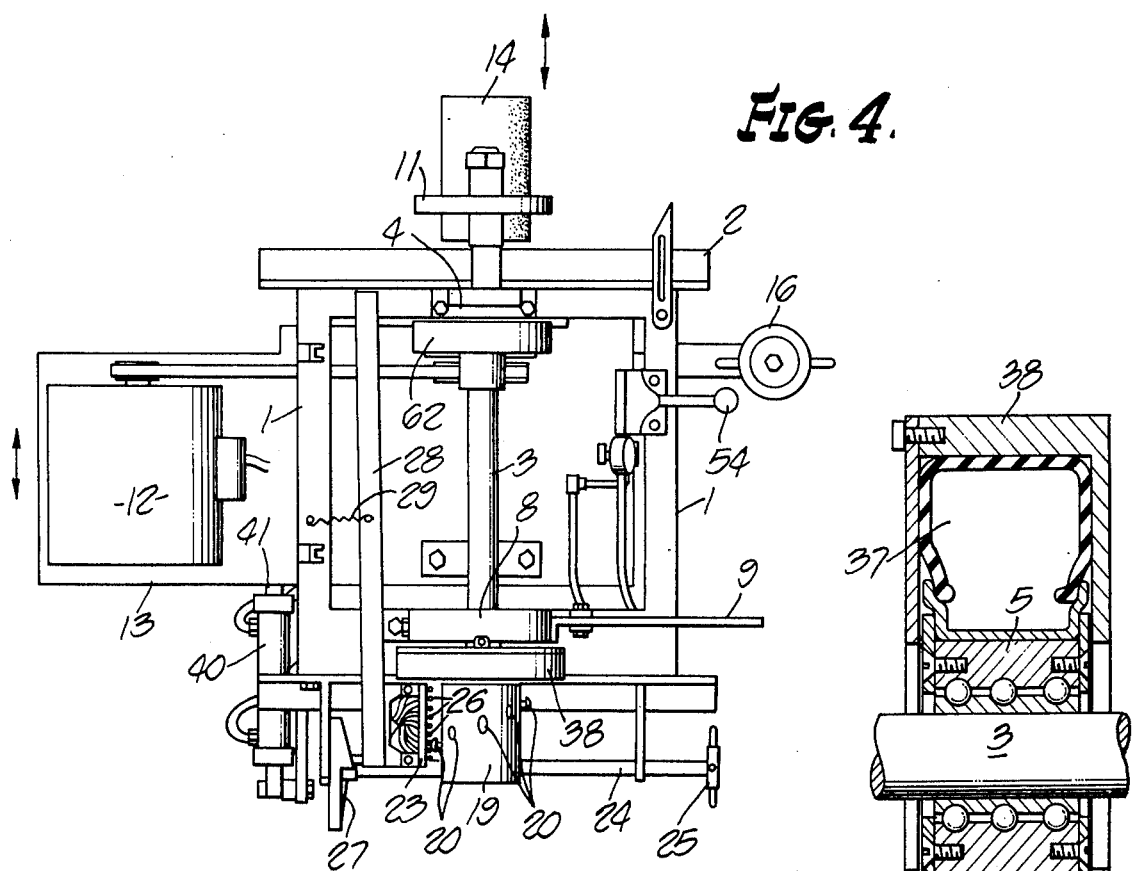
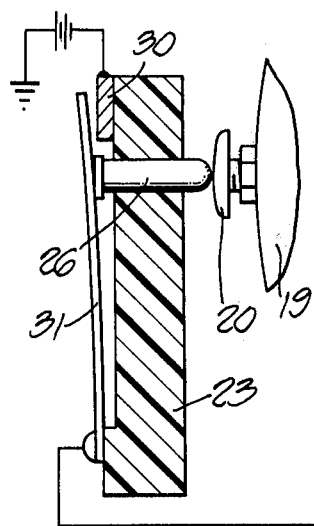
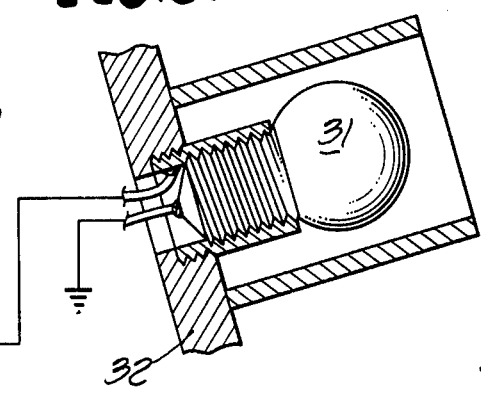
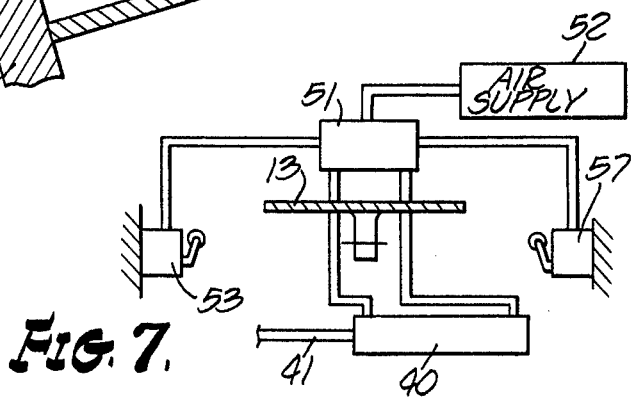
FIG. 4.
FIG. 5.
FIG. 6.
FIG. 7.

WHEEL BALANCE AND TRUING MACHINE

This application is a division of Copending Application Ser. No. 432,461 filed Jan. 11, 1974 and now Pat. No. 3,911,751 issued Oct. 14, 1975.

BACKGROUND OF THE INVENTION

It is essential for the proper operation of a motor vehicle that its wheels be truly round, and also that its wheels be balanced both statically and dynamically. Although equipment is available in the prior art for truing the roundness of tire/wheel combinations, and although separate equipment is also available in the prior art for testing static unbalances in the tire/wheel combination, and for enabling static unbalance compensating weights to be placed at appropriate positions on the tire, there does not appear to be available in the prior art a satisfactory machine in which all the operations necessary to test and correct static and dynamic unbalances, and other distortions in the tire/wheel combination, may be carried out in a single series of operations and in a single machine.

The present invention is intended to provide a simple and inexpensive balance machine, in which a tire/wheel combination may be trued, and then tested for static and dynamic unbalances, so as to permit necessary compensations to be made. This is achieved in the machine of the invention in a relatively simple and straightforward manner, and without the need to remove the tire/wheel combination from the machine, until all the tests and compensations have been made.

BRIEF DESCRIPTION OF THE DRAWINGS

FIG. 4 is a top plan view of the machine, also with the cover removed to reveal the internal operating components;

FIG. 5 is a fragmentary enlarged view of certain electric components which are incorporated into the machine of the invention for indicating purposes during the dynamic unbalance test procedure;

FIG. 6 is an enlarged section of a pneumatic bearing which is included in the embodiment of the invention to be described; and FIG. 7 is a schematic representation of a control mechanism in the machine which establishes a longitudinal reciprocal movement of a rotatably-driven abrasive wheel, which is used to true the tire/wheel combination mounted on the machine.

DETAILED DESCRIPTION OF THE ILLUSTRATED EMBODIMENT

Figure 1:
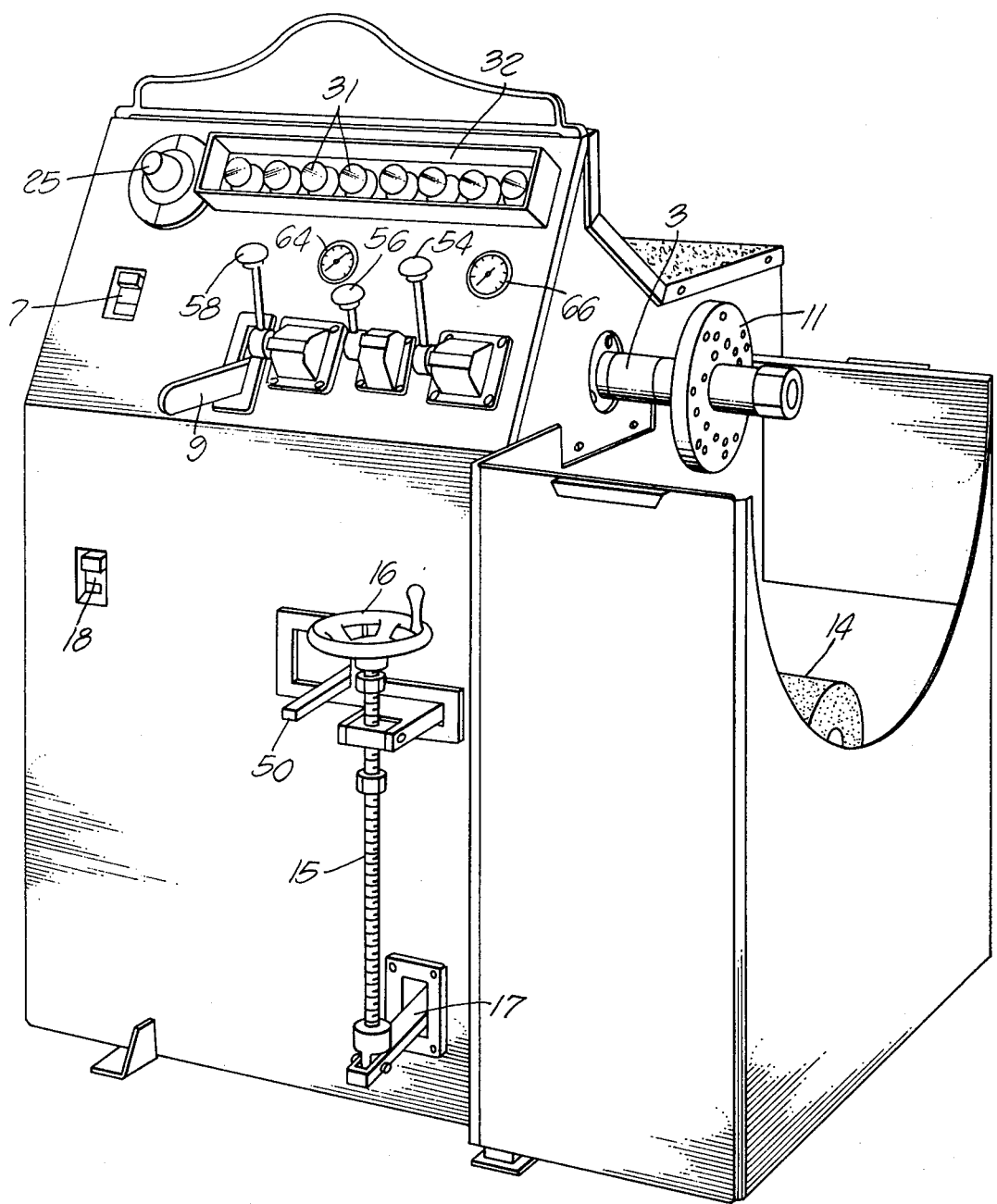
FIG. 1 is a perspective representation of one embodiment of the machine of the present invention, taken from the front and to one side.

The machine illustrated in the drawings includes a frame 1 having a top 2. A drive shaft 3 is mounted in the frame 1, and it extends across the frame, as best shown in FIG. 6 from the front to the rear of the frame. The drive shaft 3 is supported in a self-aligning bearing 4 at the front of the frame, and in a self-aligning bearing 5 (FIG. 8) which is enclosed in a cage, or casing, 38 by means of an annular resilient stabilizer pneumatic bearing member 37. Pressurized fluid may be introduced into the interior of the pneumatic bearing member 37 by means of a control lever 58 (FIG. 1), and the pressure of the pressurized fluid within the pneumatic bearing 37 is indicated by a gauge 64 (FIG. 1) on the front panel.

When the pressure in the pneumatic bearing is decreased to essentially zero, the rear end of the drive shaft 3 is then free to be displaced in a radial direction as the shaft rotates. However, when pressurized fluid of an appreciable pressure is introduced into the annular bearing 37, the rear end of the shaft 3 is maintained on the axis of rotation of the shaft, and rotates about that axis in the bearing 5.

A hub 11 is mounted on the forward end of the drive shaft 3. The hub has a plurality of holes formed in it, as best shown in FIG. 1, to permit a wide variety of tire/wheel combinations to be mounted on the hub so that the static and dynamic unbalances in such tire/wheel combinations may be measured and appropriate compensations may be made. A brake 8 is provided for shaft 3 which is operated by handle 9.

Figure 2:
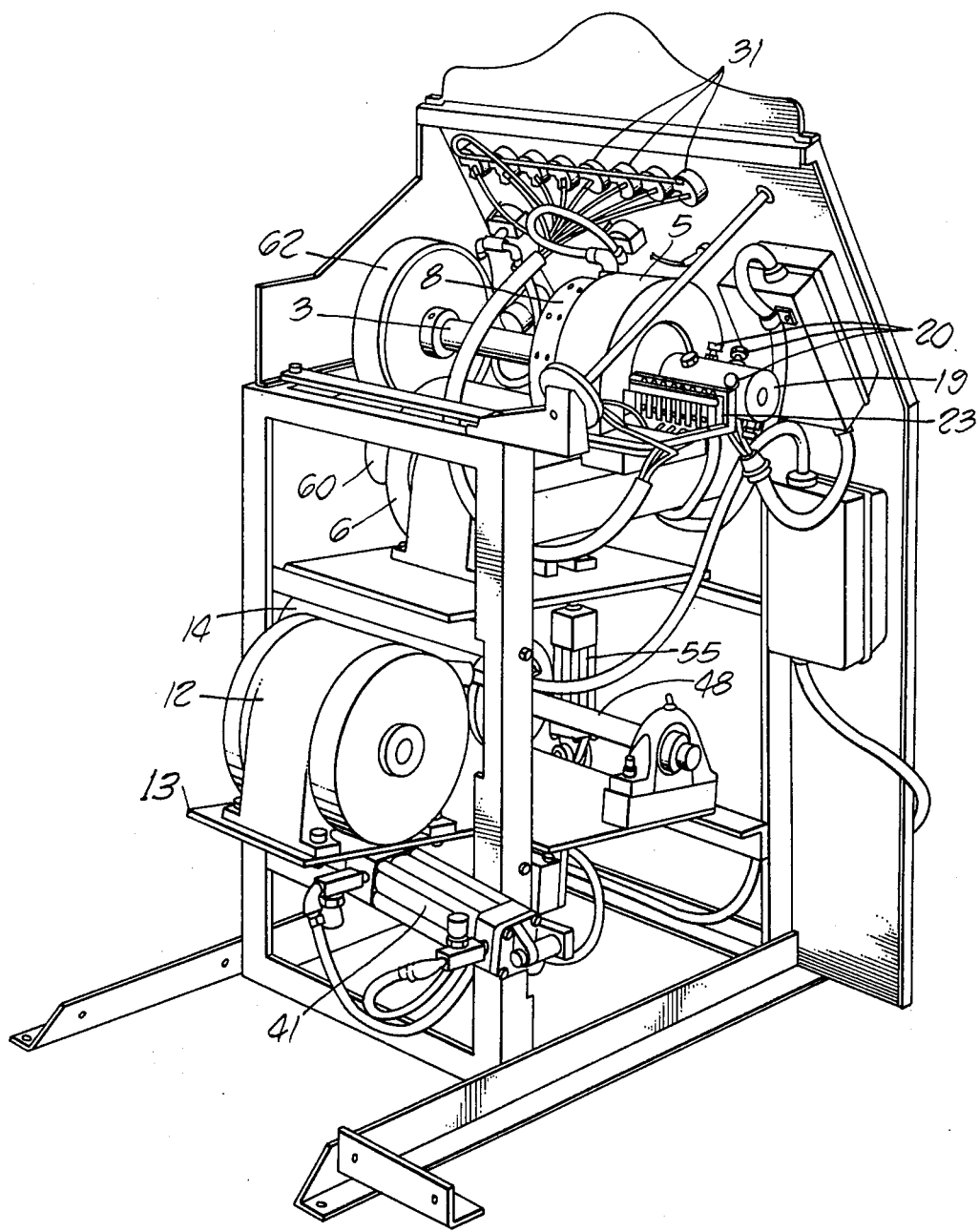
FIG. 2 is a perspective representation of the embodiment of FIG. 1, taken from the rear and to one side, and with the casing removed to reveal the internal components of the machine.

The drive shaft 3 is driven by a motor 6 which is coupled to the shaft 3 through a friction clutch composed of a pair of friction wheels 60 and 62. The energization of motor 6 is controlled by a switch 7 on the front panel. The friction wheel 60 is mounted on the drive shaft of the motor 6, and the friction wheel 62 is mounted on the drive shaft 3. Actually, the friction wheels 60A, 60B (FIG. 3) of different diameters are provided for speed control purposes, as will be described. When a lever 54 (FIG. 1) on the front panel of the machine is operated, it closes a pneumatic power cylinder 55 (FIG. 2) to move the motor 6 and friction wheel 60 upwardly, so that the friction wheel 60 engages the friction wheel 62 to engage the clutch and enable the motor to drive the shaft 3. When the lever 54 is moved in the opposite direction, the clutch is disengaged. A meter 66 on the front panel indicates the pressure of pressurized fluid introduced into the power cylinder 55 to cause the clutch 60, 62 to engage.

A platform 13 is supported in the frame 1 in a horizontal plane, and for reciprocal movement in the direction of the axis of rotation of a shaft 48, as shown by the arrow on the lefthand side of the representation of FIG. 4. Such reciprocal movement to the platform 13 is imparted by a pneumatic power cylinder 40, whose piston rod 41 is connected to the platform 13. The power cylinder 40 is controlled, in the manner shown in FIG. 7 by a valve 51 which selectively direct pressurized fluid from an air supply 52 to one end or the other of the power cylinder 40, under the control of a pair of switches 53 and 57.

The operation is such that the power cylinder 40 moves the platform 13 to one of its limiting positions, at which position it changes the conditions of the switches 53 and 57, so that the power cylinder is operated to return the platform to its original position, at which the reverse action occurs. The reciprocal movement of the motor 12 is under the control of a lever 56 (FIG. 1) on the front panel of the machine.

A motor 12 is mounted on the platform 13, and it drives the shaft 48 through a belt drive 49, the shaft 48, also being mounted on the platform 13 to be moved with the motor 12 under the operation of the power cylinder 40. An abrasive wheel 14 is mounted on the forward end of the shaft 48. Then, when the motor 12 is energized by the actuation of a switch 18 (FIG. 1) the abrasive wheel 14 is caused to rotate. Then, when the reciprocating mechanism of FIG. 9 is activated by the actuation of lever 56, the abrasive wheel 14 is also caused to move back and forth reciprocally along its axis of rotation of shaft 48, as indicated by the double arrow at the top of FIG. 4, as it is being rotated.

Figure 3:
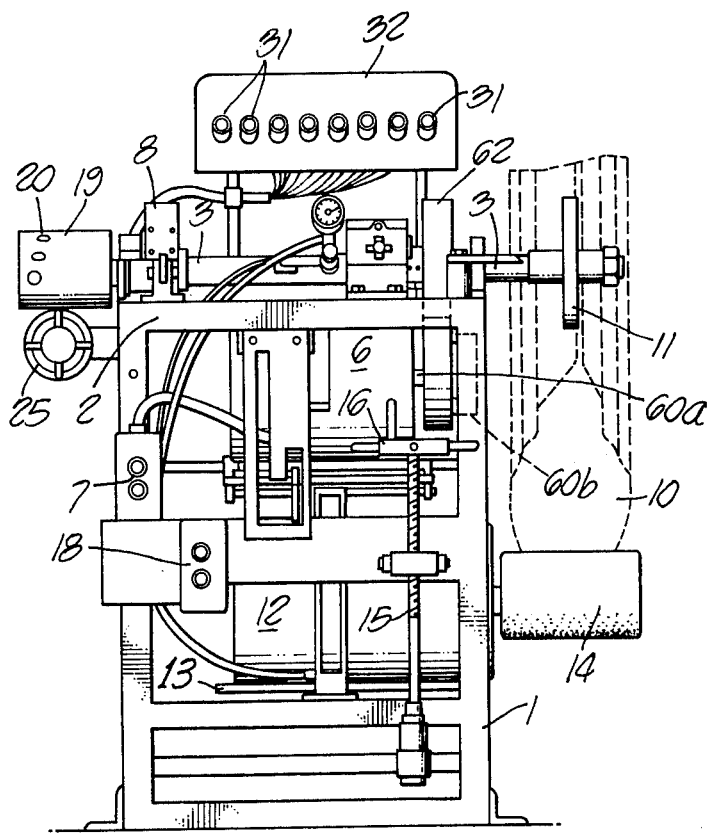
FIG. 3 is a front elevation of the embodiment of FIG. 1, with the casing removed.

The platform 13 may be moved vertically to bring the abrasive wheel 14 up into operative engagement with the peripheral surface of the tire/wheel combination supported on the hub 11, as shown in FIG. 3. This is achieved by means of a vertical lead screw 15 which is supported on the frame 1, and which may be turned by a manually operated wheel 16. The lower end of the wheel 15 is connected to the platform 13 through a lever 17 (FIG. 1), so that the wheel 16 is turned, the abrasive wheel 14 may be brought up into engagement with the periphery of the tire, or lowered out of engagement therewith.

A drum 19 is mounted on the rear end of the shaft 3, and the drum includes a plurality of buttons 20 which successively engage various contacts 26 on a contact panel 23, when the contact panel is brought into engagement with the buttons on the drum. The contact panel is mounted on the end of a lever arm 28, and it is normally biased out of engagement with the buttons 20 by means of a spring 29 connected between the lever arm and the frame 1. A cam 27 is mounted on a shaft 24, and the shaft 24 may be rotated by a manually operated dial wheel 25. When the shaft is rotated, the cam 27 engages the lower end of the lever 28, and moves the contact panel 23 into engagement with the buttons 20 against the spring bias of the spring 29.

As shown in FIG. 5, the contact panel 23 includes a grounded contact strip 30, and a plurality of resilient contact strips 31. The contact panel also includes a plurality of slide-able contacts 26. When any contact 26 is not engaged by a corresponding button 20 on the drum 19, it closes a circuit to a corresponding one of a plurality of light bulbs 31 which are mounted on a base 32 on the front panel of the machine, as shown in FIG. 1. Then, as each contact 26 is engaged by a corresponding button 20, the contact 26 is moved to break the connection to its corresponding lamp 31. The buttons 20 and contacts 26 are arranged so that each of the lights 31 represent a different angular position of the hub 11.

In the operation of the machine described above, a tire/wheel combination which is to be balanced and trued is mounted on the hub 11, as shown in FIG. 3. As stated above, the hub 11 is provided with a large number of mounting holes so that a wide variety of wheels may be accomodated. The tire pressure of the tire/wheel combination on the hub is checked and adjusted to normal inflation pressure. The stabilizer lever 58 is actuated to inflate the stabilizer pneumatic bearing 37, so as to assure that the hub shaft 3 is held centered in its bearings 4 and 5. The lever 54 is then actuated to disengage the friction clutch 60, 62 which couples the motor 6 to the drive shaft 3. The lateral position of motor 6 may be controlled by a lever 50 (FIG. 1) to cause either the wheel 60A or the wheel 60B to engage the wheel 62 in the friction clutch, so that the hub 11 may be driven at two different speeds. For example, one of the speeds may be of the order of 85 miles per hour, and the other may be of the order of 100 miles an hour.

For the static balance test, the lever 54 is actuated to disengage the friction clutch 60, 62 which couples the motor 6 to the shaft 3, and brake 9 is released, so that the tire/wheel combination on the hub 11 may now be freely turned with the hub and shaft 3. Static balancing weights may now be placed on the wheel at selected angular positions, in accordance with the usual practice, until the tire/wheel combination is balanced on the hub and has no tendency to turn the hub to any particular angular position.

The lever 50 is set to establish the speed of rotation of the hub at the low speed setting of, for example, 80 miles per hour. The stabilizer lever 58 is then actuated until the meter 64 shows, for example, that the pneumatic bearing 37 has a pressure of 40 psi, and the lever 54 is actuated until the pneumatic power cylinder 55 (FIG. 2) operating the clutch 60, 62 has a pressure of, for example, 100 psi as indicated by the valve 66, to cause the clutch to engage. The switch 7 is then actuated to energize the motor 6, which turns the shaft 3 ad the hub 11 which supports the tire/wheel combination. The tire/wheel combination should initially be turned by hand as an assist to startup. After the tire/wheel combination has come up to speed, the clutch drive pressure can be dropped to around 50 psi, by operating the handle 54, and as indicated by the meter 66.

The switch 18 is now operated to energize the motor 12, and the cause the abrasive wheel 14 to rotate. The lever 58 is then actuated to establish the reciprocal movement of the abrasive wheel 14 along its axis of rotation. After the abrasive wheel 14 has been brought up to speed, the handle 16 is turned to bring the abrasive wheel up into contact with the peripheral surface of the tire supported on the hub 11. The high spots of the tire surface are then ground off until two or three treads of the center of the tire are running true, these being the only part of the tire actually in contact with the roadway at highway speeds.

The wheel 16 is now turned in the opposite direction to lower the abrasive wheel 14 away from the peripheral surface of the tire, and the switch 18 is actuated to turn off the motor 12. Also, the lever 56 is actuated to terminate the reciprocal action of the abrasive wheel. The switch 7 is now actuated to turn off the motor 6, and the lever 54 is operated to disengage the clutch 60, 62. The brake lever 9 is then operated to actuate the brake 8 and stop the rotation of the shaft 3, hub 11, and the tire/wheel combination mounted on the hub.

The static balance operation described above is then repeated, with the compensating weights being changed and/or adjusted, until again there is no tendency for the tire/wheel combination to turn the hub 11 to any particular angular position. Again, the abrasive wheel 14 may be operated to perform a finish grind on the tire surface, and the static balance may be rechecked, while assuring that the periphery of the tire is running true with respect to the center of the wheel. When these operations have been completed, the dynamic balance procedures may be instituted.

At this time the lever 50 is adjusted to change the speed of the tire-wheel combination on the hub 11 from a speed of the order of 80 miles an hour which was used during the above-described grinding operation, to a speed of the order of 100 miles per hour for the dynamic balance operation. Then the lever 54 is operated to cause the clutch to engage. The clutch pressure should be of the order of 50 psi on the power cylinder 55 to permit free radial displacement of the rear end of the shaft 3 in the event the tire/wheel combination is not in dynamic balance.

For the dynamic balance operation, the rear end of shaft 3 remote from the hub 11 must be free to be displaced radially from the axis of rotation of the shaft in the event the tire/wheel combination on the hub is not dynamically balanced. This freedom of radial movement is achieved by providing the self-aligning bearing 4 at the front end of the shaft, and the controllable pneumatic bearing 38 at the rear end. At the outset of the dynamic balance operation, the lever 58 is operated to establish the pressure in the pneumatic bearing 38 to the order of 40 psi; and the lever 54 is operated to establish; a pressure of the order of 100 psi in the power cylinder 55 to engage the clutch 60, 62. The switch 7 is then turned on to energize motor 6 to bring the hub 11 and the tire/wheel combination on the hub up to rotational speed.

The dial 25 is initially set to displace the contact panel 23 away from the buttons 20 on the drum 19, so that when the circuit of the lights 31 is activated for the dynamic balance test and all of the lights are initially energized. The pressure in the pneumatic bearing 37 is now reduced substantially to zero by movement of lever 58. Then, as the tire/wheel combination is being rotated at high speed, the dial 25 is turned slowly so as to move the contact panel 23 towards the buttons 20 on the drum 19, due to the action of the cam 27. This action is continued until one of the lights 31 begins to flicker, and that particular light is designated by a appropriate marker.

The flickering light 31 indicates the position on the tire at which appropriate compensating weights should be placed to compensate for the dynamic unbalance. To determine the amount of weight required for compensation purposes, the pressure is returned to the pneumatic bearing 37 by actuation of the lever 58 until all the lights are blinking. The pressure then indicated by the meter 64 is a measure of the weight required at the indicated angular position of the tire/wheel combination to achieve dynamic balance.

The switch 7 is then actuated to turn off the motor 6, and full pressure is returned to the pneumatic bearing 37 by appropriate actuation of the lever 58. The clutch 60, 62 is disengaged by operation of the lever 54, and the brake lever 9 is operated to stop the rotation of the shaft 3, and of the tire/wheel combination mounted on the hub 11. The dial 25 is then turned until all the lights 31 are energized, and the tire/wheel combination on the hub is turned by hand, so as to turn the shaft 3 and drum 19 until the previously designated light is turned off. The resulting angular position of the tire/wheel combination when the disignated light is extinguished, indicates the position that the dynamic balance weights should be mounted on the wheel to obtain dynamic balance.

Specifically, compensating weights are placed at diametrically opposite positions on the horizontal diameter of the wheel at the particular angular position at which the previously designated light is extinguished, with each of the compensating weights being one half the indicated weight required to compensate dynamic unbalance. One of the compensating weights is mounted on the inside of the wheel, and the other is mounted on the outside.

If it is found that a static unbalance compensating weight was previously placed at the indicated position for placement of the dynamic compensating weight, the weight of the static compensating weight is taken into account in selecting the dynamic compensating weights, which then may replace the static compensating weight.

As a final test, the machine is operated with minimum pressure in the pneumatic bearing 37, and the dial 25 is turned until the lights 31 begin to blink. If all of the lights blink, the tire/wheel combination on the hub is truly round and is truly balanced, both statically and dynamically.

The invention provides, therefore, an improved wheel balance machine which is capable in a single series of operations of determining static and dynamic unbalance of a tire/wheel combination, and of permitting compensating weights to be placed on the wheel. The improved machine of the present invention is also capable of truing the central peripheral surface of the tire to a round configuration with respect to its axis of rotation. All of the foregoing operations may be carried out without removing the tire/wheel combination from the machine, and the operation of the machine results in a tire-wheel combination which is truly round, and which is balanced both statically and dynamically.

It will be appreciated that while a particular embodiment of the invention has been shown and described, modifications may be made. It is intended in the claims to cover the modifications which come within the spirit and scope of the invention.

We claim:

1. A wheel balance machine for testing a tire/wheel combination for dynamic and statis unbalances, said machine including: a frame; a drive shaft; a first bearing rotatably mounted one end of said drive shaft to said frame; a drive motor; means coupling said drive motor to said drive shaft; a hub mounted at said one end of said drive shaft adjacent said first bearing for supporting a tire/wheel combination for rotation by said shaft about the axis of rotation of said shaft; a second bearing rotatably mounting the other end of said shaft to said frame; control means coupled to said second bearing for causing said second bearing to maintain the other end of said shaft on the axis of rotation thereof for one condition of said contol means, and said control means being adjustable to a second condition for causing said second bearing to permit radial deflection of said other end of said shaft upon rotation of said shaft in the presence of dynamic unbalance of said tire/wheel combination; indicating means mounted at said other end of said shaft for indicating the angular position of said shaft at which such radial deflection occurs; an abrasive wheel rotatably mounted on said frame; a second drive motor coupled to said abrasive wheel to impart rotational motion to said abrasive wheel; and adjustable means coupled to said abrasive wheel for moving said abrasive wheel towards and away from the periphery of the tire/wheel combination mounted on said hub.

2. The wheel balance machine defined in claim 1, and which includes means coupled to said abrasive wheel for imparting reciprocal movement to said abrasive wheel along the axis of rotation thereof.

3. The wheel balance machine defined in claim 1 in which said indicating means includes a drum mounted on the other end of said drive shaft; electric contact means mounted on said frame and movable towards and away from said drum from a stand-by position to a position in which said contact means is operated by said drum; and electric indicator lamps connected to said contact means and operable by said drum to indicate angular positions of said drive shaft.

4. The wheel balance machine defined in claim 1, in which said first bearing is a self-aligning type.

5. The wheel balance machine defined in claim 1, in which said coupling means comprises a first friction wheel mounted on said drive shaft; a second friction wheel mounted on said drive motor; and pneumatic power cylinder means operable to bring said friction wheel into engagement with one another to cause said drive motor to drive said drive shaft through said coupling means.

6. The wheel balance machine defined in claim 2, in which said last-named means comprises a pneumatic power cylinder, and a switch at each end of the cylinder alternately to direct pressurized fluid to each end of the power cylinder.

* * * * *